Figure 10:
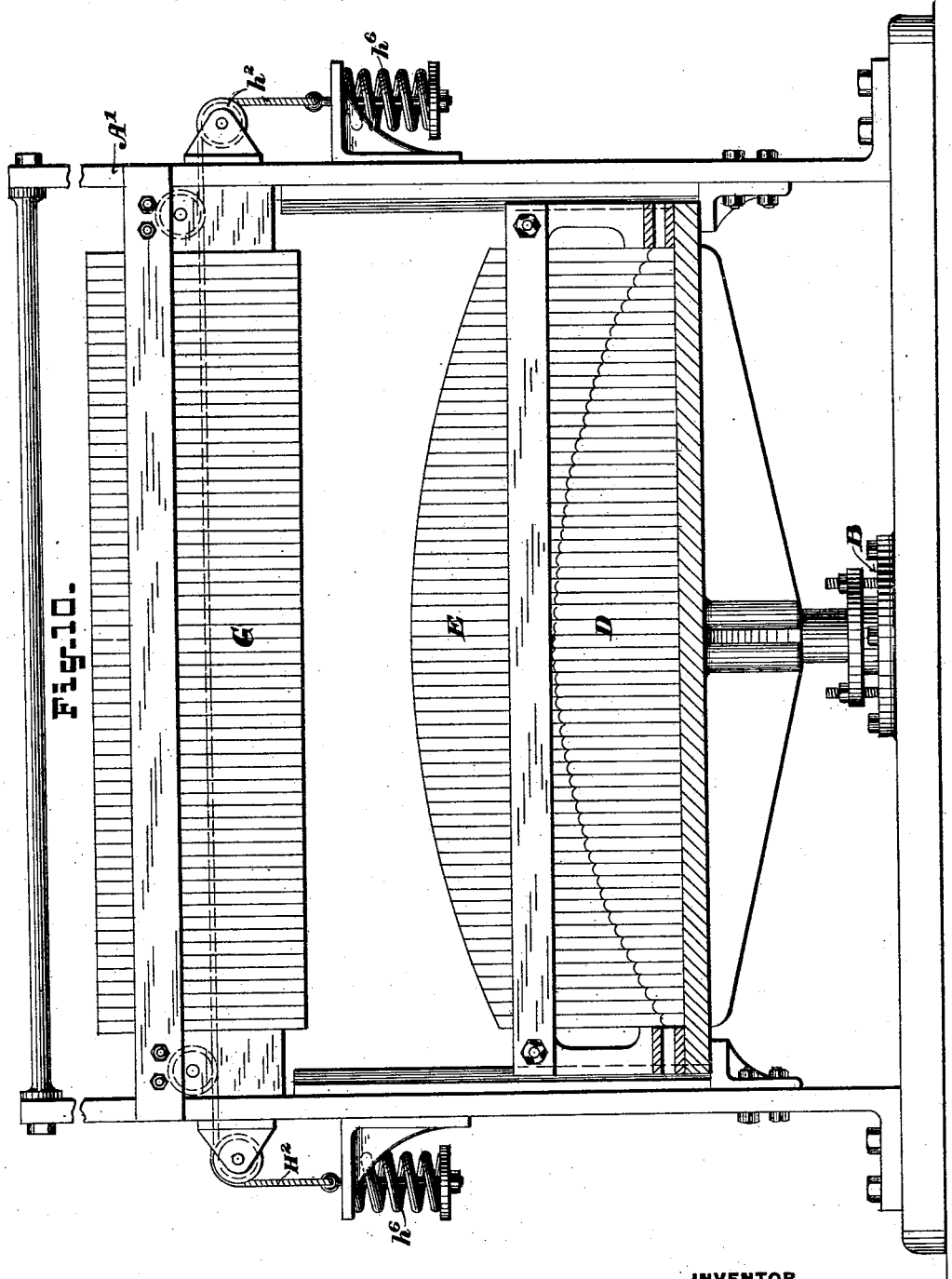

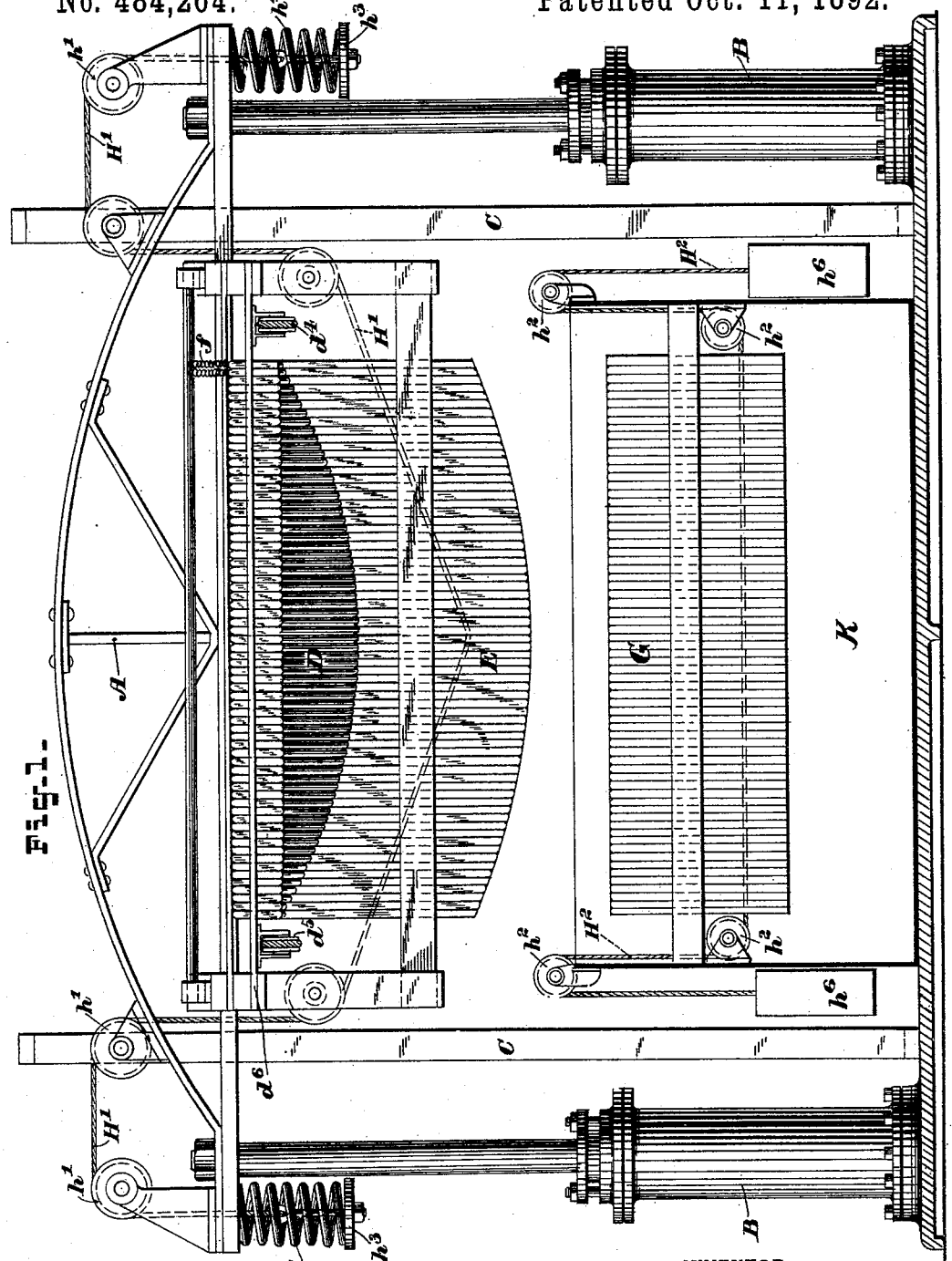

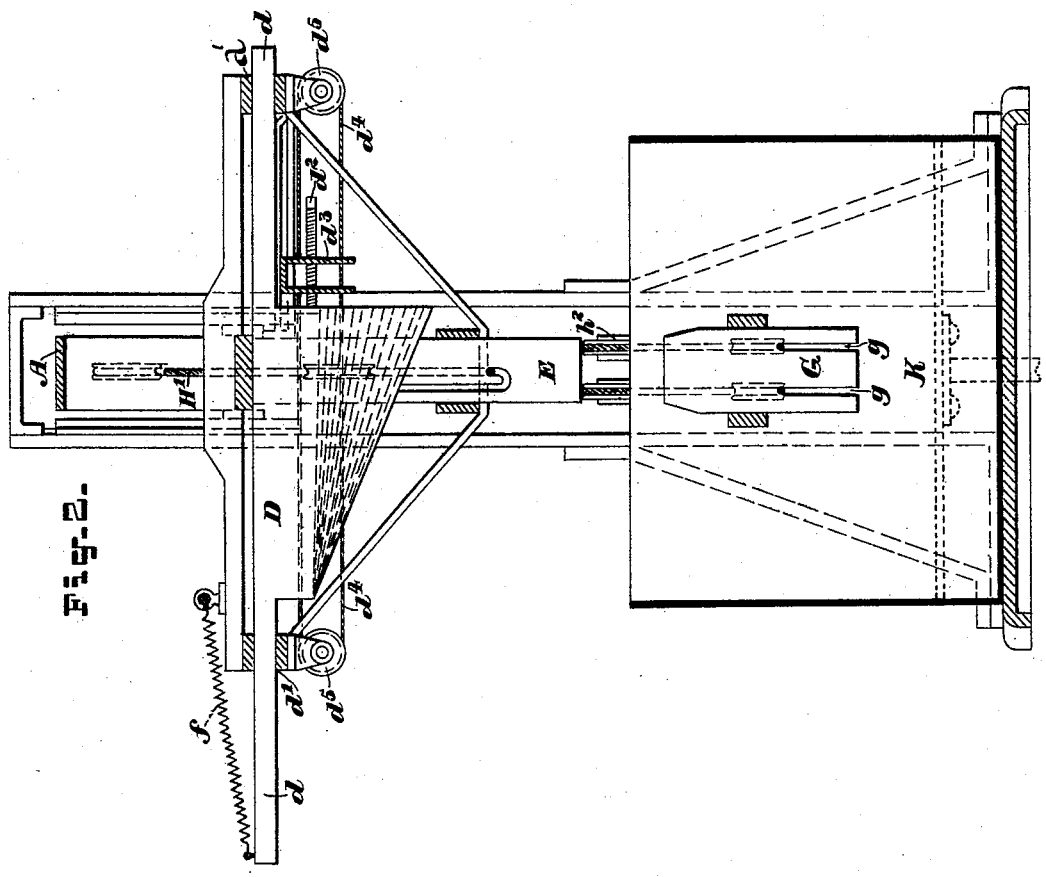
(No Model.) 5 Sheets—Sheet 2.
N. B. TRIST.
MEANS FOR SHAPING METAL PLATES, BARS, &c.
No. 484,264. Patented Oct. 11, 1892.

(No Model.) 5 Sheets—Sheet 3.
N. B. TRIST.
MEANS FOR SHAPING METAL PLATES, BARS, &c.
No. 484,264. Patented Oct. 11, 1892.
Fig. 5.     Fig. 6.     Fig. 3.     Fig. 4.
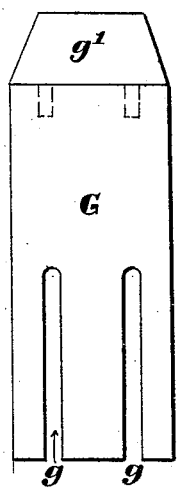  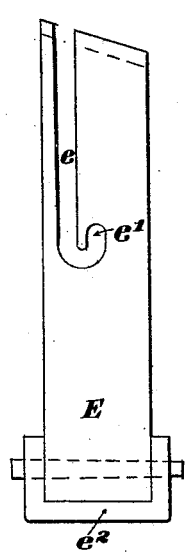 
Fig. 8.     Fig. 7.
 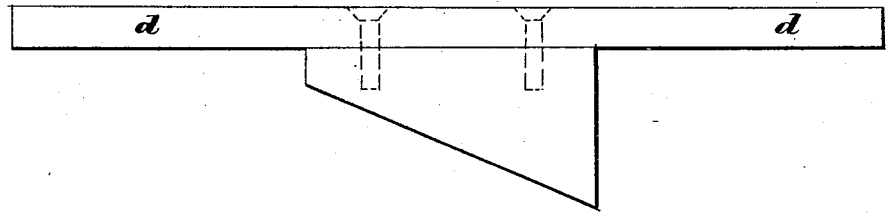
Fig. 9.
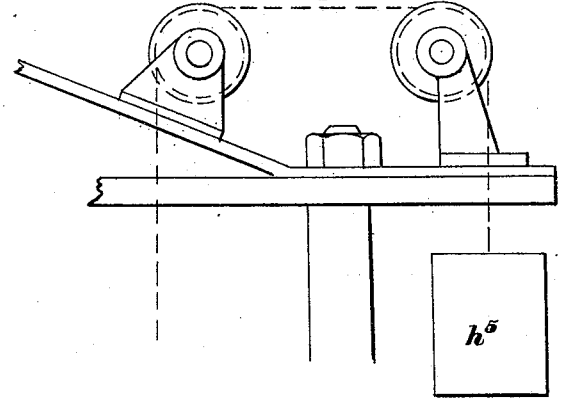
WITNESSES: George Brown, H. C. Tener
INVENTOR, Nicholas B. Trist by Charles A. Terry Att'y.

(No Model.) 5 Sheets—Sheet 5.

N. B. TRIST.
MEANS FOR SHAPING METAL PLATES, BARS, &c.

No. 484,264. Patented Oct. 11, 1892.

WITNESSES:

INVENTOR,

UNITED STATES PATENT OFFICE.

NICHOLAS B. TRIST, OF PITTSBURG, PENNSYLVANIA.

MEANS FOR SHAPING METAL PLATES, BARS, &c.

SPECIFICATION forming part of Letters Patent No. 484,264, dated October 11, 1892.

Application filed January 14, 1892. Serial No. 418,039. (No model.)

*To all whom it may concern:*

Be it known that I, NICHOLAS B. TRIST, a citizen of the United States, residing in Pittsburg, in the county of Allegheny, State of Pennsylvania, have invented certain new and useful Improvements in the Construction of Metal Working Apparatus, of which the following is a specification.

My invention relates to certain improvements in the construction of metal-working apparatus; and the object of the invention is to provide means for shaping metal plates, bars, &c., and giving them any required contour.

The general plan of construction and operation of the apparatus is as follows: An anvil is formed by a series of flat plates placed side by side, but movable in such manner that their faces may conform to any required curve. A second series of plates, corresponding to the anvil-plates, is employed for forcing the metal against the anvil-plates and giving thereto the required curve or bend. For this purpose it is necessary that the striking or forming plates should have their faces adjusted to the curve which it is desired to impart to the metal bar or plate. Each of the striking-plates is therefore movable independently of the others, and some suitable device, as a wedge, cam, eccentric, or set-screw, is provided for giving each striking-plate its proper position, so that their faces will present the particular curve or contour desired. When the object to be bent is placed upon the anvil-plates and the striking-plates are forced against it, the anvil-plates adjust themselves to the same curve and the object is shaped between them. If it is desired to temper the materials by the same operation, the anvil may be constructed to yield and allow the object while still held between the two sets of plates to pass into an oil or other tempering bath, or the tank may be provided with a false bottom adapted to raise and lower the surface of the fluid when required. In order to change the curve, it is necessary only to adjust the striking-plates, and this may be readily done, as will appear in connection with the detail description of the drawings.

There are various different ways in which the invention may be carried into effect without departing from the spirit of the invention. In the accompanying drawings I have shown a form clearly illustrating the principles of the invention and the practical application of the same.

Figure 11:
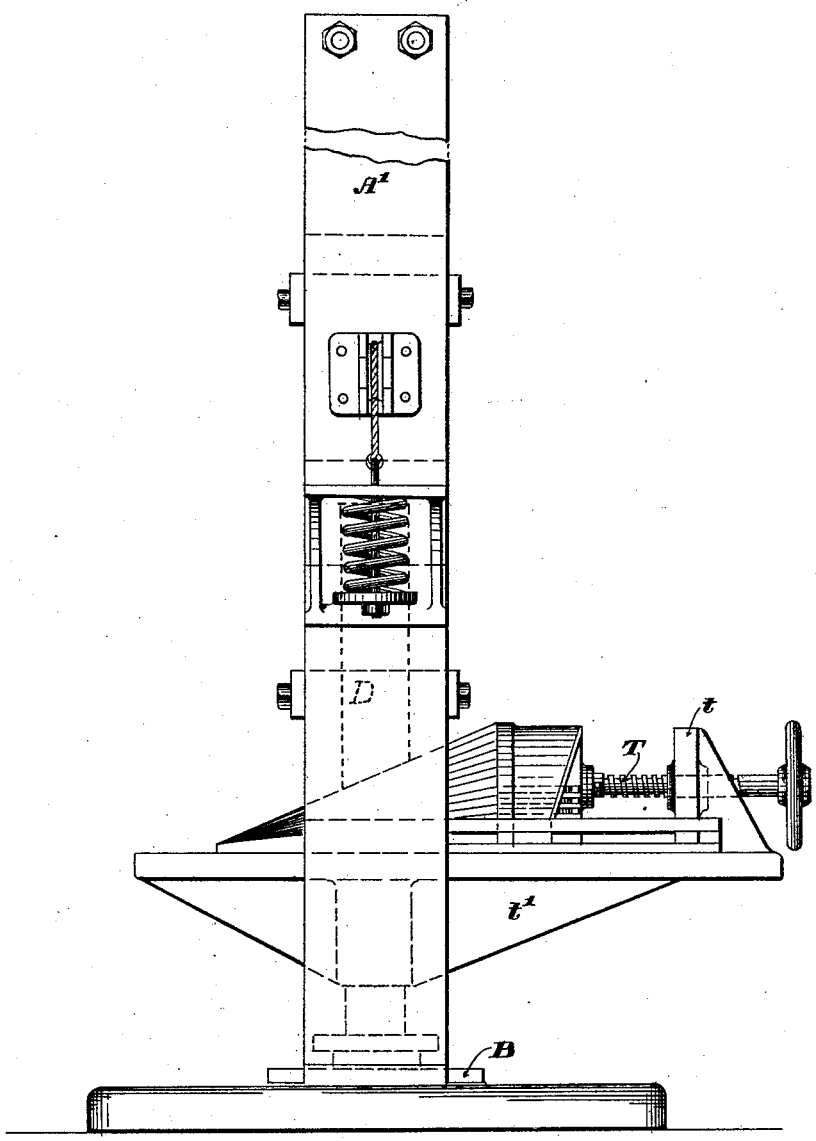

In the drawings, Figure 1 is a front elevation of the machine; and Fig. 2 is an end view, partly in section, of the same. Figs. 3, 4, 5, 6, 7, and 8 illustrate various details. Fig. 9 illustrates a modification. Figs. 10 and 11 are respectively a front elevation and a side view of a modification.

Referring to the figures, A represents a vertically-movable frame, and B B hydraulic cylinders or other suitable apparatus for forcing the frame upward and downward, as desired. The frame A is guided by the standards C. The frame carries a series of movable keys or wedges D. These are designed to serve as adjustments for the striking or forging plates E, which they back. The wedge-plates D are constructed with arms $d$ at each end, and these slide through guides $d'$ in the frame A. This permits the wedge-plates to be moved along the backs of the striking-plates E. Each of the wedges D is constructed of gradually-increasing depth from one end to the other; but the pitch of the successive plates from each end of the series to the central one gradually increases, so that while the curve formed by their faces at the left-hand end in Fig. 2 is very slight that formed at the right-hand end is much more acute, and between the two extremes a curve of any intermediate radius may be found. It will be seen that by moving the entire body of wedges D back or forward across the backs of the plates E the faces of the latter may be caused to assume any required degree of curvature corresponding to the faces of the wedges. If, therefore, it is desired to form a plate or bar with a large radius, then the keys are moved into their forward position—that is to say, toward the right hand in Fig. 2—and in order to obtain curves of shorter radii the keys are pushed farther back—that is to say, toward the left hand in Fig. 2. In case it were never necessary to obtain any curve other than one to be found upon the faces of the wedges when in a given relative position, then the entire series might be constructed in one piece having a face corresponding to that presented by the series of wedges; but as it is sometimes desired to produce irregular or reverse curves it may be desirable to have separate wedge-plates, as shown, to correspond to the individual striking-plates E. These separate wedge-plates are then made adjustable with reference to each other by means of set-screws $d^2$, passing through a suitable brace $d^3$, one such screw being provided for each wedge-plate. It is evident that by forcing certain of the plates farther in with reference to the others any desired modification in the curve presented by their faces may be obtained. Suitable springs $f$ may serve to force the wedges back against the set-screws. The entire system of wedges may be adjusted by moving the bar D' forward or back—as, for instance, by means of cords $d^4$ at its respective ends. These cords pass over wheels $d^5$, carried by the frame A, and fasten to the cross-bar $D^2$. They may be fastened in their required position in any suitable manner. An adjusting-screw—such as shown in Fig. 11—may be used.

The anvil upon which the striking-plates operate consists of a series of plates G, similar to the other series E. The plates G are independently movable, and when the striking-plates are forced down upon them they adjust themselves to the curve presented by the faces of the plates E. A convenient method of supporting the plates E and G so that they will thus readily adjust themselves consists in threading them upon flexible cords or cables H' and $H^2$ and placing these cords under suitable tension. Thus the cord H', carrying the plates E, passes over suitable pulley-wheels $h'$ and is fastened at its ends to plates $h^3$, which are placed under pressure by springs $h^4$ or by weights $h^5$, Fig. 9. In like manner one or more cords $H^2$, supporting the plates G, pass over pulley-wheels $h^2$ and are fastened to weights $h^6$. It should be noted that in order to cause the plates E to lie up evenly against the wedges D it is convenient to have the apertures in the central plates farther down than those in the outer ones, as shown in Fig. 1, for with this construction a less tension need be exerted upon the cord than would otherwise be required. In Figs. 3 and 4 one of the plates E is shown upon an enlarged scale, and, as appears in Fig. 3, the aperture for receiving the cord H' is made by cutting a slot $e$ downward from the upper end a suitable distance and turning the lower end of this slot upward, as shown at $e'$. The cord then rests in the upward bend. This construction permits the removal and replacing of individual plates. The striking ends of the plates may be faced by suitable caps $e^2$, if desired, and these may be replaced when worn. In order to prevent any plate E from slipping by its corresponding wedge, the upper end is grooved, as shown at $e^3$, to receive the rounded edge of the wedge, as shown in Fig. 9. The upper ends of the plates E are also beveled to correspond to the angle of the corresponding wedges. The plates G may be constructed as shown in Figs. 5 and 6—that is to say, with two slots $g$ extending upward a suitable distance for receiving the cords $H^2$. The upper ends of the plates may have removable caps, as shown at $g'$, and the corners are shown as beveled off, leaving a flat face of the same width as the faces of the striking-plates.

For the purpose of tempering metal which is being operated upon a bath of suitable material may be contained in a tank K, within which the plates G stand. This tank may have a movable false bottom, as indicated in dotted lines, for the purpose of raising the bath over the plates G, submerging the material after it is bent. When the plates E are then forced down, the anvil-plates will yield sufficiently to allow their faces, and thus the metal plate, to become submerged in the bath.

In Figs. 10 and 11 a modification is illustrated, in which the anvil and hammer are reversed in position. The general plan of construction in this instance is essentially the same as that already described, with the exception that the hammer and wedges are here carried in a frame A', which may be forced upward by the hydraulic device B causing the plates E to strike against the plates G. The latter, while held down by the stress of the springs $h^6$ at the ends of the cord $H^2$, will nevertheless yield and conform to the curve presented by the faces of the plates E. The wedges D are adjustable independently, as in the form first described, and the entire series may be adjusted by a suitable screw T, extending through a lug $t$ upon the base-plate $t'$ of the frame A'.

I claim as my invention—

1. The combination of a series of independently-movable plates forming a hammer, a series of adjusting plates or wedges longitudinally movable relatively to the first-named plates for setting them in any required relative positions, and a series of independently-movable plates forming an anvil for the hammer.

2. In a metal-working machine, the combination of a hammer and an anvil, each consisting of a series of independently-movable plates placed side by side, and adjusting devices consisting of wedges movable along the backs of the plates of one set for fixing them in definite relative positions, and thereby causing their faces to present a determinating curve or contour.

3. In a metal-working machine, a hammer consisting of a series of plates placed side by side and a yielding support therefor and a corresponding series of backing-wedges for adjusting the plates, the pitch of the wedges from either end to the center gradually increasing.

4. In a metal-working machine, the combination of a series of vertically-movable plates placed side by side and having their upper ends beveled at different angles and a series of adjusting-wedges for setting said plates, the respective wedges engaging the beveled ends of the several plates, substantially as described.

5. In a metal-working machine, the combination of a series of plates independently movable and a series of wedges for adjusting the plates, the pitch of said wedges increasing from each end to the center of the series and the end of each plate adjacent to said wedges being beveled to correspond to the pitch of the adjacent wedge.

6. In a metal-working machine, the combination of a series of plates forming a hammer and a series of wedges for adjusting the position of said plates, a flexible cord or cable extending through said plates supporting the same, and springs or weights placing said cord under tension.

7. In a metal-working machine, a hammer or anvil composed of a series of independently-movable sections, a cord or cable supporting said sections, and a spring or weight placing said cord under tension.

8. In a metal-working machine, a hammer and an anvil, each composed of a series of independently-movable plates, adjustable backing-wedges for adjusting the relative positions of the plates of one series, and a vertically-movable frame supporting one of the series above the other, and means for advancing the frame, substantially as described.

9. In a metal-working machine, the combination of the vertically-movable frame A, a hammer carried thereby, consisting of adjustable plates and a yielding support for the same, and the hydraulic cylinders for advancing the frame, substantially as described.

10. In a metal-working machine, a hammer consisting of a series of independently-movable plates and series of beveled wedges for adjusting the plates, said wedges being rounded upon the edges presented to the plates and the plates being grooved to correspond, substantially as described.

11. In a metal-working machine, a hammer composed of independently-movable plates and adjustable wedges for the respective plates, each plate and its corresponding wedge fitting together by a groove and rounded edge, the end of the plate being beveled to correspond to the pitch of the wedge.

In testimony whereof I have hereunto subscribed my name this 11th day of January, A. D. 1892.

NICHOLAS B. TRIST.

Witnesses:
CHARLES A. TERRY,
JAMES WM. SMITH.